United States Patent
Carmichael et al.

(10) Patent No.: US 9,416,245 B2
(45) Date of Patent: Aug. 16, 2016

(54) CHEMICAL COMPOSITION FOR DUST SUPPRESSION AND SOIL STABILIZATION

(71) Applicant: Metcalf Excavation, Inc., Parachute, CO (US)

(72) Inventors: Kayla Carmichael, Speedway, IN (US); Travis Jason Metcalf, Parachute, CO (US); Carl M. Metcalf, II, Parachute, CO (US)

(73) Assignee: Metcalf Excavation, Inc., Parachuté, CO (US)

( * ) Notice: Subject to any disclaimer, the term of this patent is extended or adjusted under 35 U.S.C. 154(b) by 0 days.

(21) Appl. No.: 14/795,643

(22) Filed: Jul. 9, 2015

(65) Prior Publication Data

US 2016/0060421 A1    Mar. 3, 2016

Related U.S. Application Data

(60) Provisional application No. 62/042,913, filed on Aug. 28, 2014.

(51) Int. Cl.
*C08K 3/16* (2006.01)
*E01C 7/35* (2006.01)
*E01C 7/36* (2006.01)
*C08K 3/30* (2006.01)

(52) U.S. Cl.
CPC ... *C08K 3/16* (2013.01); *C08K 3/30* (2013.01); *E01C 7/35* (2013.01); *E01C 7/36* (2013.01); *C08K 2003/166* (2013.01); *C08K 2003/3045* (2013.01)

(58) Field of Classification Search
CPC ...... C08K 3/16; C08K 3/30; C08K 2300/166; C08K 2300/3045; C08L 5/005; C09K 3/22; C09K 17/40; E01C 7/35; E01C 7/36
See application file for complete search history.

(56) References Cited

U.S. PATENT DOCUMENTS

| | | | |
|---|---|---|---|
| 3,345,193 A | 10/1967 | Pitchford | |
| 3,752,079 A | 8/1973 | Lewer | |
| 4,417,992 A * | 11/1983 | Bhattacharyya | B09B 1/004 252/88.1 |
| 4,571,116 A | 2/1986 | Patil et al. | |
| 4,592,931 A * | 6/1986 | Cargle | C08K 5/092 106/900 |
| 4,993,839 A | 2/1991 | Brock | |
| 5,747,104 A * | 5/1998 | Baebel | C09K 3/22 427/136 |
| 5,827,568 A | 10/1998 | Wickett | |
| 6,065,903 A | 5/2000 | Doyle | |
| 6,149,351 A | 11/2000 | Doyle | |
| 6,156,828 A | 12/2000 | Wickett | |
| 6,729,805 B2 * | 5/2004 | Wathen | C09K 17/14 106/244 |
| 6,855,754 B2 | 2/2005 | Takamura et al. | |
| 6,946,083 B2 * | 9/2005 | Horman | C09K 17/36 252/88.1 |
| 7,070,709 B2 | 7/2006 | Schilling et al. | |
| 7,081,270 B2 * | 7/2006 | Hawkins | C09K 17/14 427/136 |
| 7,157,021 B2 | 1/2007 | Bytnar et al. | |
| 7,250,460 B1 * | 7/2007 | Takamura | C08K 3/0008 524/423 |
| 7,514,018 B2 | 4/2009 | Schilling et al. | |
| 7,947,193 B2 | 5/2011 | Bytnar et al. | |
| 8,033,750 B2 * | 10/2011 | Vitale | C09D 5/024 404/75 |
| 8,052,890 B2 | 11/2011 | Nguyen | |
| 8,066,448 B2 * | 11/2011 | Vitale | C09K 3/22 404/75 |
| 8,070,383 B2 * | 12/2011 | Vitale | C09D 5/024 252/88.1 |
| 8,124,231 B2 * | 2/2012 | Fan | C08F 220/18 427/136 |
| 8,132,982 B2 * | 3/2012 | Vitale | C09K 3/22 252/88.1 |
| 8,210,769 B2 * | 7/2012 | Vitale | A01B 77/00 404/72 |
| 8,313,668 B2 * | 11/2012 | Vitale | C09K 17/22 252/88.1 |
| 8,419,312 B2 * | 4/2013 | Vitale | C09D 5/024 404/72 |
| 8,469,629 B2 * | 6/2013 | Vitale | C09K 3/22 252/88.1 |
| 8,507,092 B2 | 8/2013 | Fan et al. | |
| 2002/0025382 A1 * | 2/2002 | Hawkins | C09K 17/14 427/136 |
| 2007/0135561 A1 * | 6/2007 | Rath | C09K 3/22 524/557 |
| 2008/0255290 A1 * | 10/2008 | Rath | C09K 3/22 524/445 |
| 2009/0061101 A1 * | 3/2009 | Cranfill | C09K 3/22 427/427.1 |
| 2012/0267565 A1 * | 10/2012 | Kerr | C09K 17/40 252/88.1 |

FOREIGN PATENT DOCUMENTS

| | | |
|---|---|---|
| JP | 55-075481 | 6/1980 |
| JP | 56-152884 | 11/1981 |
| JP | 60-8373 A * | 1/1985 |
| JP | 2002-138282 | 5/2002 |
| WO | WO 03/002820 A1 * | 1/2003 |

OTHER PUBLICATIONS

Derwent-Acc-No. 2003-442301, abstract of Chinese Patent Specification No. CN 1400273 A (Mar. 2003).*

* cited by examiner

*Primary Examiner* — Anthony J Green
(74) *Attorney, Agent, or Firm* — Dorr, Carson & Birney PC

(57) ABSTRACT

A chemical composition for dust suppression and soil stabilization includes a mixture of water-based asphalt emulsion and magnesium chloride solution.

13 Claims, No Drawings

CHEMICAL COMPOSITION FOR DUST SUPPRESSION AND SOIL STABILIZATION

RELATED APPLICATION

The present application is based on and claims priority to the Applicant's U.S. Provisional Patent Application 62/042,913, entitled "Chemical Composition For Dust Suppression And Soil Stabilization," filed on Aug. 28, 2014.

BACKGROUND OF THE INVENTION

1. Field of the Invention

The present invention relates generally to the field of chemical compositions for dust suppression and soil stabilization. More specifically, the present invention discloses a chemical composition for dust suppression and soil stabilization that combines an asphalt emulsion with an aqueous magnesium chloride solution.

2. Background of the Invention

A variety of chemical compositions have been used in the past for dust control and suppression, soil stabilization, erosion control, road stabilization and the like—particularly on unpaved roads, construction sites and oilfield sites. But, a single product has not been found that met all of expectations.

Two types of products are commonly used in the field. The first are water-based asphalt emulsions. For example, a water-based cationic asphalt emulsion, commonly known as CCS-1h, is commercially available from many suppliers. It is typically blended as an emulsion containing about 85% water and 15% asphalt and sprayed onto the road surface like a thick coating. It loses its moisture very rapidly with the heat of the sun and from the wicking by the subsurface it is applied to. Traffic must be kept off of the product after spraying for an entire day as the traffic peels up the product on the tires of the vehicles. It must be applied again every seven to ten days as it forms cracks and potholes very quickly even on solidly-built roads. It is usually applied at the rate of about 0.48 gallons per square yard. This product also sits on top of the subsurface and is too thick to penetrate to any significant degree, and peels up very easily although it is a solid surface once it cures.

The other competing family of products in this field employ an aqueous solution of magnesium chloride ($MgCl_2$). For example, one typical formulation consists of magnesium chloride mixed with about 70% water by weight. It is widely used to control dust and also stabilizes the road and dirt and makes the material more solid. This solution is typically applied at a rate of about 0.5 gallons per square yard. The magnesium chloride does chase the water down through the subgrade and is dispersed throughout the subsurface and able to be reworked if more water is added. Magnesium chloride is hydroscopic and pulls moisture from its surroundings (i.e., ground humidity and surrounding material). The problem is that it must be reactivated with more water every few weeks because the salt crystals on the surface dry out and create their own dust that only adds to the problem. It also becomes slick during the wetting process and rain storms.

The prior art in this field also includes U.S. Pat. No. 6,855,754 (Takamura et al.). This patent discloses a paving/coating formulation that includes the combination of: (1) an asphalt emulsion; (2) a water solution of any of a variety of alkali or ammonium salts or hydroxides; and (3) a water solution of any of a variety of metal salts, including Group IIA salts such as magnesium chloride. However, the proportional ranges of ingredients mentioned in the Takamura patent are far outside those of the present invention. The present formulation uses much less asphalt emulsion and more magnesium chloride solution. Also, Takamura is primarily concerned with cold paving with an aggregate. Takamura mentions that the formulation could be used more generally for a coating. However, given the high proportion of asphalt emulsion in the Takamura composition, the result would be a thin surface coating similar to conventional asphalt coatings. In contrast, the present invention is intended for dust suppression by penetrating to a significant depth into the ground, rather than just forming a solid layer on the surface.

SUMMARY OF THE INVENTION

This invention provides a chemical composition for dust suppression and soil stabilization that includes a mixture of water-based asphalt emulsion and magnesium chloride solution.

These and other advantages, features, and objects of the present invention will be more readily understood in view of the following detailed description.

DETAILED DESCRIPTION OF THE INVENTION

The present invention is essentially a combination of asphalt emulsion and magnesium chloride solution that gains the benefits of both products. The result is a very durable product that lasts a long time and uses significantly less water. In the preferred embodiment of the present invention, the chemical composition of the product is about 4% asphalt (in emulsion), 25% magnesium chloride, 1% potassium sulfate and 70% water by weight. More generally, the chemical composition of the present invention can be about 1%-8% asphalt (in emulsion), and 19%-32% magnesium chloride, by weight, with the balance being water (e.g., about 60%-80% water). Optionally, the composition can also include about 0.05%-5% of an alkali salt (e.g., potassium sulfate). This corresponds to a ratio of about 20% asphalt emulsion (e.g., CCS-1h) and 80% magnesium chloride solution. It should be noted that other asphalt emulsions could be substituted.

The following is a discussion of the present applicants' test of the present invention. First, a commercially-available asphalt emulsion (CCS-1h) was diluted with water to make an emulsion containing about 35% asphalt emulsion and 65% water. It should be noted that the amount of water was cut back in comparison to the prior art discussed above, so when the magnesium chloride solution was added it would not thin it down too much. The resulting asphalt emulsion was then heated to about 150° F. A magnesium chloride solution containing about 30% magnesium chloride and 70% water was heated to about 160° F. This allowed the asphalt emulsion to not clot in the blending process. Both products were then placed in a tank with a recirculation pump and blended for about two hours. The product was then loaded into a distributor truck and applied to a test road surface. The subgrade of the road surface was wet down with water and the mixture was applied at a rate of about 0.25 gallons per square yard.

The results were amazing. The test road surface gained the durability of the emulsion on the top layer and the water retention of the magnesium chloride solution. The product also allowed the asphalt emulsion in the mixture to soak down into the ground as deep as the magnesium chloride solution normally does, instead of just sitting on the top the way asphalt emulsion normally would on its own. With the product being dispersed throughout the base material instead of just sitting on top, it is not brittle and stays hydrated and no cracks have formed in a week. Asphalt emulsions, such as CSS-1h, normally start showing cracks and failures within a few days after application. There was also the benefit in water savings at around 35% less water used in initial preparation of the this new product. It is estimated that total water savings over the useful life of the product will end up being about 50-60% of the water normally used with either of the conventional products alone over a comparable period.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for dust suppression and soil stabilization comprising:
    heating an asphalt emulsion in water;
    heating a solution of magnesium chloride and an alkali salt in water;
    blending the asphalt emulsion and solution in proportions to produce a composition containing about 60%-80% water, 1%-8% asphalt, 19%-32% magnesium chloride, and 0.05%-5% alkali salt, by weight; and
    distributing the resulting composition over a surface at a rate of about 0.25 gallons per square yard.

2. The method of claim 1 further comprising the step of wetting the surface with water before applying the composition.

3. The method of claim 1 wherein asphalt comprises about 4% of the composition by weight.

4. The method of claim 1 wherein magnesium chloride comprises about 25% of the composition by weight.

5. The method of claim 1 wherein the alkali salt comprises potassium sulfate.

6. The method of claim 5 wherein potassium sulfate comprises about 1% of the composition by weight.

7. A method for dust suppression and soil stabilization for a surface, said method comprising:
    producing a composition containing 60%-80% water, 1% to 8% asphalt in emulsion with the water; and 19%-32% magnesium chloride by weight; and
    distributing the composition over the surface at a rate of about 0.25 gallons per square yard.

8. The method of claim 7 further comprising the step of wetting the surface with water before applying the composition.

9. The method of claim 7 wherein asphalt comprises about 4% of the composition by weight.

10. The method of claim 7 wherein magnesium chloride comprises about 25% of the composition by weight.

11. The method of claim 7 wherein the composition further comprises 0.05%-5% of an alkali salt by weight.

12. The method of claim 11 wherein the alkali salt comprises potassium sulfate.

13. The method of claim 12 wherein potassium sulfate comprises about 1% of the composition by weight.

* * * * *